United States Patent [19]

Waldron

[11] Patent Number: 5,775,110
[45] Date of Patent: Jul. 7, 1998

[54] COOL ROOM TEMPERATURE CONTROL

[75] Inventor: Stephen N. Waldron, Lingfield, England

[73] Assignee: The BOC Group plc, Windlesham, England

[21] Appl. No.: 804,141

[22] Filed: Feb. 20, 1997

[30] Foreign Application Priority Data

Feb. 21, 1996 [GB] United Kingdom ............ 9603669

[51] Int. Cl.⁶ .................. F17C 9/02; F25D 23/12
[52] U.S. Cl. ............... 62/50.2; 62/259.1; 62/332
[58] Field of Search .................... 62/50.2, 50.4, 62/52.1, 53.2, 332, 175, 259.1-2

[56] References Cited

U.S. PATENT DOCUMENTS

| | | | |
|---|---|---|---|
| 3,287,925 | 11/1966 | Kane et al. | 62/53.2 X |
| 3,507,128 | 4/1970 | Murphy et al. | 62/64 |
| 3,512,370 | 5/1970 | Murphy et al. | 62/64 |
| 4,356,707 | 11/1982 | Tryee, Jr. et al. | 62/381 |
| 5,170,631 | 12/1992 | Lang et al. | 62/63 |
| 5,245,838 | 9/1993 | Cavalea, III | 62/259.1 |
| 5,410,886 | 5/1995 | Wallace et al. | 62/332 X |

FOREIGN PATENT DOCUMENTS

| | | |
|---|---|---|
| 1242626 | 11/1969 | United Kingdom . |
| 2283561 | 8/1993 | United Kingdom . |
| 2284613 | 12/1993 | United Kingdom . |

*Primary Examiner*—William E. Wayner
*Attorney, Agent, or Firm*—R. Hain Swope; Salvatore P. Pace

[57] ABSTRACT

A method of controlling the temperature in an enclosure comprising providing means for dispersing a vaporized cryogenic life-supporting gas within the enclosure to supplement and/or replace a mechanical refrigeration system normally provided therein. The chilling capacity of such a cryogenic system is significantly greater than that available in any presently known mechanical system and hence enhanced overall operation may be achieved. Additionally, the fact that the cryogenic gas is breathable permits an operator to enter the enclosure without presenting any hazard thereto.

5 Claims, 2 Drawing Sheets

COOL ROOM TEMPERATURE CONTROL

FIELD OF THE INVENTION

The present invention relates to temperature control and relates particularly, but not exclusively, to such control for use in refrigeration applications.

BACKGROUND OF THE INVENTION

Presently known refrigeration apparatus generally comprise mechanical refrigeration equipment which is employed to chill the atmosphere in which items such as, for example, perishable foodstuffs are stored. Generally, the foodstuff is stored in a purpose built compartment or building which is insulated from its surroundings and directly linked to the refrigeration apparatus. The apparatus itself must be of sufficient size and refrigeration capacity to ensure that adequate refrigeration is provided during even the hottest of weather and/or during periods of peak demand. Such peak demands occur, for example, when new supplies of materials to be refrigerated are deposited in the storage room. Often, there exists a requirement for a temporary refrigerated storage facility which may only be provided at great expense to the user. In addition to this, it will be appreciated that the cost of providing a mechanical refrigeration system sufficiently large to cope with the occasional but significant peak demand is also undesirable. Further, it is often necessary to provide a backup refrigeration system in the event that the primary system is being maintained or breaks down.

It is an object of the present invention to provide a method of controlling the temperature in an enclosure which reduces and possibly overcomes the problems associated with presently known refrigeration systems.

SUMMARY OF THE INVENTION

Accordingly, the present invention provides a method of controlling the temperature in an enclosure, the method comprising forming an insulated enclosure the interior of which is to be subjected to temperature control; providing a storage vessel, for storing a quantity of liquefied breathable, life supporting gas; providing a dispensing means, within said insulated enclosure for dispensing said gas and including vaporizing means for vaporizing the gas during dispensing; dispensing the gas in a vaporized form from the dispensing means such that the vaporized gas acts to chill any atmosphere within the enclosure thus reducing the temperature therein.

DETAILED DESCRIPTION OF THE INVENTION

Figure 1:
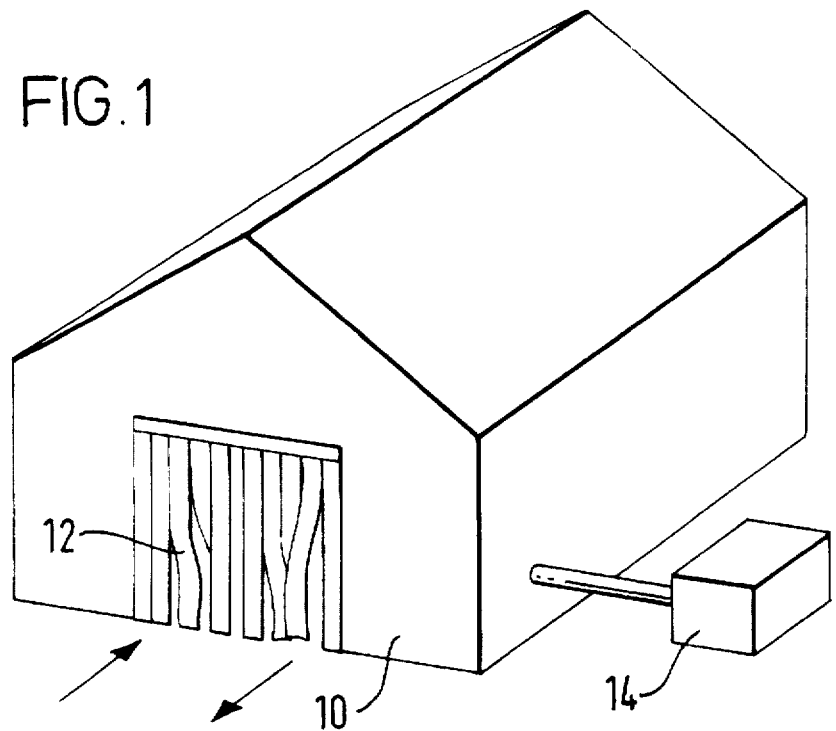
FIG. 1 is an illustration of a prior art cold store.

The temperature controlling method in accordance with the present invention utilizes a liquefied gas mixture preferably having an oxygen concentration of between 18% and 23% by volume when fully vaporized. Such a gas is advantageous in that it is breathable and life supporting without presenting a significantly enhanced fire hazard over and above that of natural air. Conveniently, the remainder of the gas mixture is nitrogen. It will be appreciated that other gaseous elements may be provided if the addition thereof is found to be desirable.

The liquefied breathable gas may be a mixture of liquid nitrogen and liquid oxygen mixed at the source of production such that the mixture provided is capable of dispensing a gas having an oxygen concentration of between 18% and 23% by volume when fully vaporized. While the actual ratio of the mixture required in its liquid form will very much depend upon the magnitude of any "enrichment" during storage and transfer, it has been found that mixtures of liquid nitrogen and liquid oxygen are surprisingly stable and, hence, little if any enrichment will take place. Indeed, enrichment will only take place when the liquid mixture boils and is therefore a function of storage tank heating. Any heating of the storage tank will result in the more volatile nitrogen boiling off and vaporizing within any headspace in the storage tank. Such vaporization will result in the remaining liquid becoming slightly enriched in the less volatile oxygen. Provided the vessel does not overpressurize and vent the vaporized atmosphere, the enrichment will be negligible. However, if in practice the liquid in the vessel does become excessively enriched then the remaining gas should be vented off and the vessel refilled.

The person skilled in the art will be well aware of the mixing process required to produce a gas mixture which, when fully vaporized, provides an oxygen concentration within the above-mentioned range. However, we offer the following calculations by way of example.

| BASIC DATA | | |
|---|---|---|
| | At Boiling Point | At 0° C. |
| Density of Oxygen | 1140. kg/m³ (at −183° C.) | 1.429 kg/m³ |
| Density of Nitrogen | 808.1 kg/m³ (at −196° C.) | 1.2505 kg/m³ |

EXAMPLE 1

Atmosphere required=18% oxygen by volume at 0° C. once dispensed from nozzles (remainder=$N_2$). Assuming 100 m³ volume:

Mass of $O_2$ required=18×1.429=25.722 kg
Mass of $N_2$ required=82×1.2505=102.541 kg
Therefore, percentage $O_2$ by weight=19.96%—the liquid will need this proportion of its mass as $O_2$.
Hence, assuming a liquid load of 100 kg, the 25.722 kg of $O_2$ equates to a liquid volume of 22.56 liters and the 102.541 kg of $N_2$ equates to a liquid volume of 126.90 liters.

EXAMPLE 2

Atmosphere required=21% oxygen by volume at 0° C.
Mass of $O_2$ required per 100 m³=30.009 kg
Mass of $N_2$ required per 100 m³=98.789 kg
Therefore percentage $O_2$ by weight=23.3%—Assuming a liquid load of 100 kg.
23.30 kg $O_2$=20.439 liters (at boiling point)
76.70 kg $N_2$=94.91 liters (at boiling point)

EXAMPLE 3

Atmosphere required=22% oxygen by volume at 0° C.
Mass of $O_2$ required per 100 m³=31.438 kg
Mass of $N_2$ required per 100 m³=97.539 kg
Therefore percentage $O_2$ by weight=24.37%—Assuming a liquid load of 100 kg.:
24.37 kg $O_2$=21.38 liters (at boiling point)

75.63 kg $N_2$=93.59 liters (at boiling point)

EXAMPLE 4

Atmosphere required=23% oxygen by volume at 0° C.
Mass of $O_2$ required per 100 $m^3$=32.867 kg
Mass of $N_2$ required per 100 $m^3$=96.288 kg
Therefore percentage $O_2$ by weight=25.45%—Assuming a liquid load of 100 kg.
25.45 kg $O_2$=29.013 liters (at boiling point)
74.55 kg $N_2$=60.244 liters (at boiling point)

The subject method comprises providing such liquefied gas into an enclosure, preferable by means of a plurality of spray bars extending within the enclosure for receiving the liquefied gas and a plurality of spray nozzles positioned along the spray bars for causing gas to be vaporized and dispensed from the bars, thereby causing the vaporized gas to disperse within the enclosure. In a particularly advantageous arrangement, the method includes the step of providing temperature sensing means within the enclosure and control means operably linked to each other and the dispensing means and causing said sensing means and control means to allow or inhibit dispersing of cryogen so as to maintain the temperature within the enclosure within a predetermined range. In a particularly advantageous arrangement, the method includes the step of providing the insulated enclosure in the form of a temporary structure.

Preferably, the method includes the step of providing the insulated enclosure in the form of a bubble wrap material having an air gap of substantially 4–5 mm and having inner and outer reflective surfaces for preventing or reducing the passage of heat through the material.

In another embodiment of the present invention, there is provided a method of operating a refrigeration system of a type comprising an enclosure for the storage of items to be refrigerated, a mechanical refrigeration apparatus for refrigerating the atmosphere within the enclosure and maintaining it within a predetermined temperature range, the method comprising the step of dispensing a quantity of liquefied, breathable life-supporting cryogenic gas from a plurality of spray nozzles within the enclosure, thereby chilling or further chilling the atmosphere therein.

In a particularly advantageous arrangement, the method includes operation of the cryogenic gas dispenser during a start-up phase of the refrigeration system, thereby more rapidly chilling the atmosphere within the enclosure. Conveniently, the cryogenic gas may be dispensed during operation of the mechanical refrigeration system, thereby supplementing said system during periods in which an enhanced chilling effect is required. If required, the cryogenic gas may be dispensed continually during the operation of the mechanical refrigeration system, to supplement the mechanical system and enhance its chilling capacity.

Referring to the drawings and particularly to FIG. 1, a conventional cold store generally comprises an insulated enclosure such as building 10 having an entrance 12 and a mechanical refrigeration apparatus 14 for extracting, refrigerating and then returning the atmosphere within the enclosure. Such systems must provide a refrigeration apparatus 14 of sufficient refrigeration capacity to accommodate what can be significant variations in the demand for chilling atmosphere. For example, while it is comparatively easy to maintain an already established temperature under stable conditions, it is difficult and sometimes impossible to provide sufficient chilling capacity to accommodate situations where large batches of product to be chilled are being added to and/or removed from the enclosure. This is particularly the case during periods of high ambient temperature during which heat inleak into the enclosure can be a significant problem. Also, fresh produce entering the enclosure will be at a somewhat higher temperature than normal and hence will require significantly more chilling once it is stored within the enclosure. Some mechanical systems even when operated at fully capacity, are unable to meet peak demands placed thereon. Consequently, the integrity of the produce can be compromised.

Figure 2:
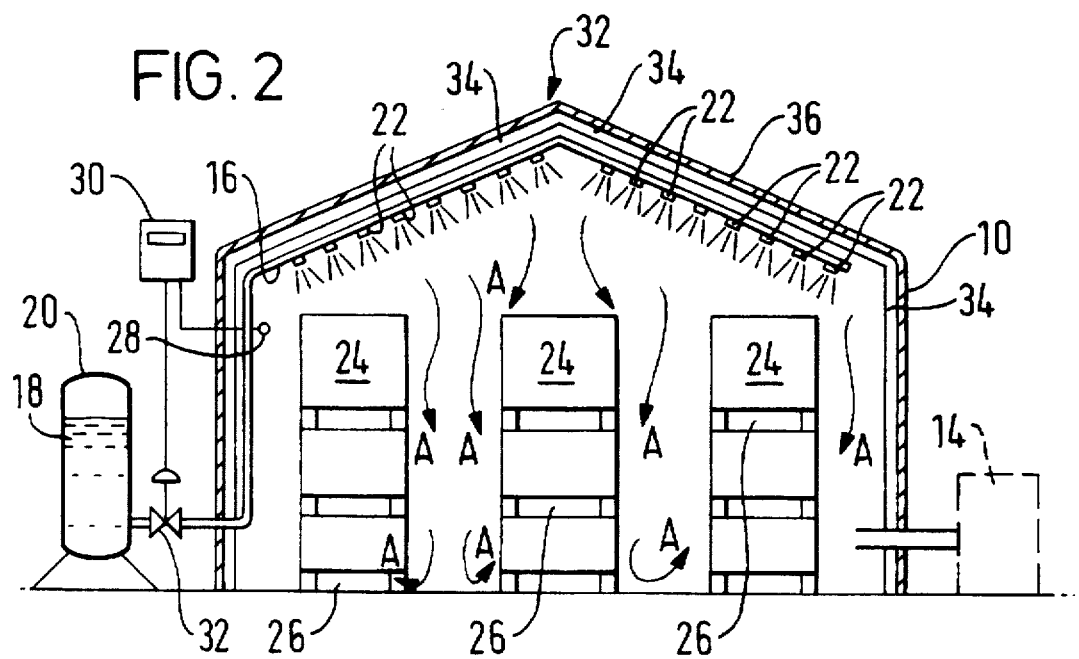
FIG. 2 is a cross sectional view of a cold store suitable for operation in accordance with the present invention.

It will be appreciated from FIG. 2 that the enclosure of FIG. 1 may be supplemented with a liquid cryogen spray bar arrangement 16 and a supply of a liquefied breathable, life-supporting gas 18 stored in storage vessel 20. The spray bars 16 extend within the enclosure and are each provided with a plurality of spray nozzles 22 positioned along the spray bars for causing gas to be vaporized and dispensed from the bars, thereby causing the vaporized gas to disperse within the enclosure as illustrated by arrows A. Often, produce 24 stored within the enclosure is stacked on the pallets 26 so as to form a number of rows separated by air spaces through which delivery vehicles or fork lift trucks may be driven. By suitable positioning of the spray bars 16 and nozzles 22, it will be possible to ensure that vaporized gas is directed downwardly into these open regions and reach the produce even at the most remote portion of each stack. In a particularly advantageous arrangement, the apparatus further includes a temperature sensor 28 positioned within the enclosure and adjacent any produce 24 stored therein which acts to monitor the temperature within the enclosure and provide the data to control apparatus 30 which is operably linked to control valve 32 for allowing or inhibiting the flow of cryogenic gas as and when necessary thereby maintaining the temperature within the enclosure within a predetermined range. It will be appreciated that the above described apparatus may be employed independently of, or in addition to a mechanical refrigeration apparatus 14 which is, therefore, optional and, hence, shown in a broken outline in FIG. 2. Full details of the operational modes will be provided later herein.

Figure 4:
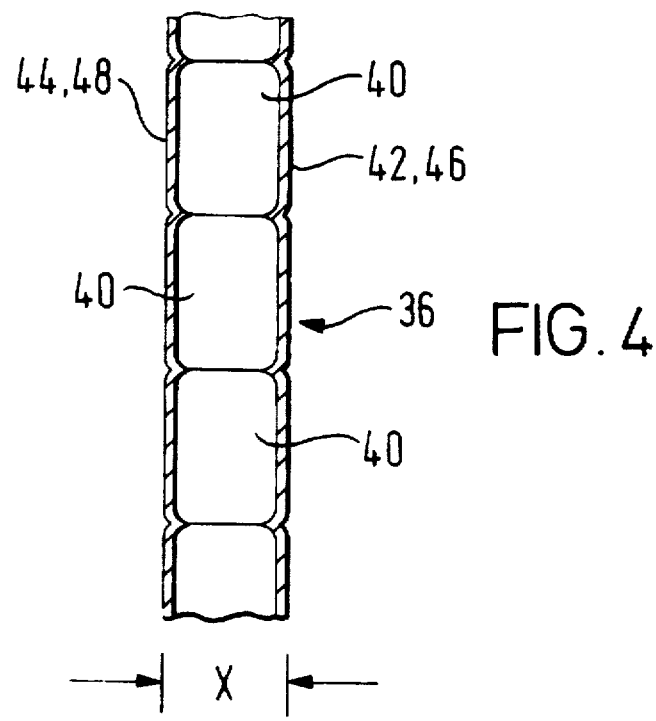
FIG. 4 is a cross sectional view of the insulation material illustrated in FIG. 2.

It will be appreciated that enclosure 10 may take the form of a presently existing enclosure or may be in the form of an insulated but temporary structure as more specifically shown at 32 in FIG. 2. This structure need only comprise a simple support frame 34 and an insulating coating provided in the form of, for example, sheets of bubble wrap material 36 as illustrated in FIG. 4. Such material comprises a plurality of bubbles of entrapped air 40 formed between inner and outer surfaces 42, 44. Preferably, each of the inner and outer surfaces 42, 44 is provided with a thin reflective surface 46, 48 for reducing the passage of heat through the insulation material. Such coatings 46, 48 are well known in the art and are therefore not described further herein. However, it has been found that optimum insulation performance can be achieved with an air gap of substantially 4–5 mm between the inner and outer surfaces 42, 44.

Figure 3:
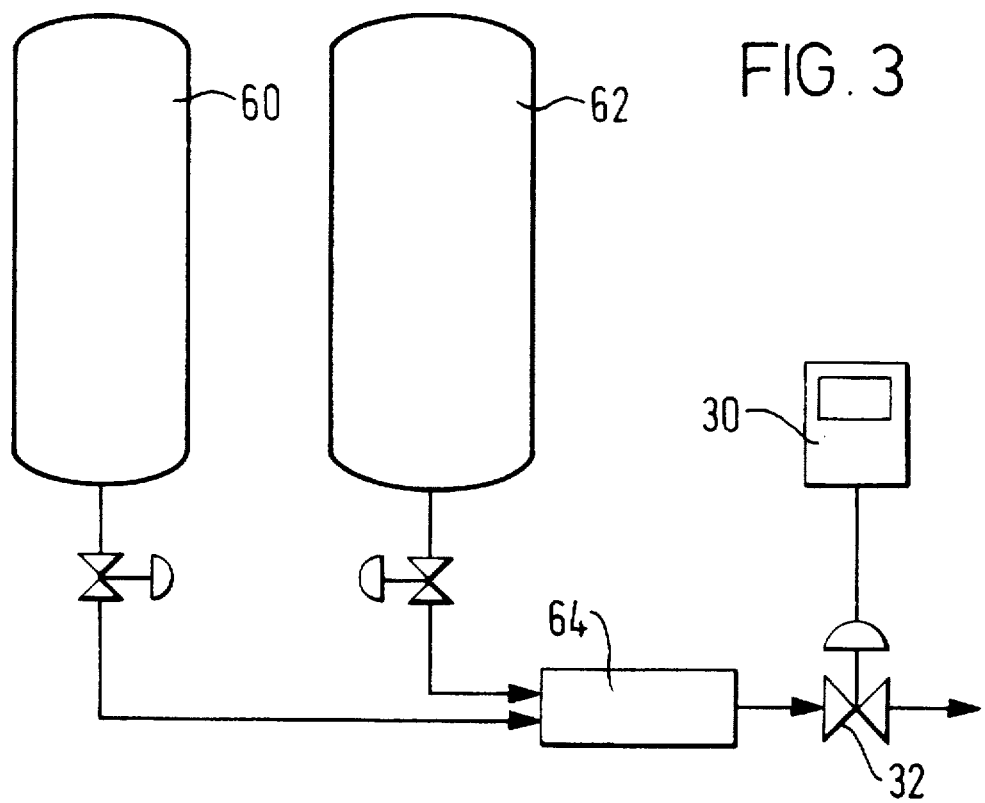
FIG. 3 is a schematic representation of an alternative gas supply apparatus.

An alternative arrangement to having a premixed liquefied breathable gas 18 stored in vessel 20 is shown in FIG. 3 wherein separate vessels 60, 62 of liquid nitrogen and liquid oxygen are provided for the supply of their respective liquids to a mixing device 64 upstream of control valve 32. Liquid supplied to mixer 64 is mixed in the desired ratios so as to provide a gas concentration in the vaporized form thereof which is both breathable and life supporting.

Operation of the above-mentioned apparatus is fairly simple and comprises the steps of monitoring the temperature within the enclosure and operating control valve 32 to allow or inhibit the flow of cryogenic gas from storage vessel 20 or vessels 60 and 62 such that it flows into spray bars 16 and exits via spray nozzles 22 in a manner which causes the vaporized gas to disperse within the enclosure. The control system 30 is operated by configuring it to maintain the temperature within a predetermined temperature range set by the operators of the apparatus. Whenever the apparatus is employed in conjunction with a mechanical refrigeration apparatus 14 it will be appreciated that the mode of operation may be varied in any one of a number of different manners. For example, the cryogenic gas may be dispensed during a start-up phase of the refrigeration system, thereby more rapidly chilling the atmosphere within the enclosure.

In practice, it has been found that the chilling capacity of such a cryogenic system is such as to allow the interior of an enclosure to be chilled from ambient temperature to a refrigeration temperature within a period of time as short as 8 minutes. This is in stark contrast with presently known mechanical systems which can often take many hours to achieve the same temperature. Clearly, the advantages of rapid temperature reduction would allow an operator to turn off any mechanical refrigeration system during periods of which the enclosure is not being used to refrigerate items placed therein, while still being able to ensure a refrigeration atmosphere is available at even the shortest of notice periods. In a further mode of operation, the cryogenic system is operated alongside a normal mechanical refrigeration system, thereby supplementing said system during periods in which an enhanced chilling effect is required. Typically, such periods might be during days of high ambient temperature and/or when large quantities of fresh produce is being delivered to the enclosure for refrigeration therein. If so desired, the cryogenic system may be operated continually during the operation of the mechanical refrigeration system 14, thereby supplementing the system 14 and allowing for a significant reduction in its chilling capacity. In this mode, a much smaller than normal mechanical refrigeration system may be employed for a given enclosure volume.

Other advantages of the present invention and its combination with a mechanical refrigeration system 14 present themselves to an operator. For example, it is often necessary to provide a backup system for any mechanical refrigeration system 14 and this may be eliminated if a cryogenic system such as that disclosed above is employed. Also, the present apparatus and method of operation thereof allows for the maintenance of a single mechanical refrigeration system while the enclosure is still being used for the storage of perishable items. In addition to the above, it will be appreciated that the present arrangement may be employed to supplement an already existing enclosure 10 thereby to provide the operator with an economic way of accommodating short term excess demand. In such an arrangement, the temporary structure shown in FIG. 2 may be added to that of a permanent structure such as that shown in FIG. 1. Once the demand has dropped, the temporary structure may be removed thereby returning the space associated therewith to be returned to its normal use.

I claim:

1. A method of controlling the temperature in an enclosure so that it does not exceed a predetermined level comprising:

a) providing a storage vessel for storing a quantity of liquefied breathable, life supporting gas;

b) providing a temporary insulated enclosure within said enclosure in the form of a bubble wrap material having an air gap of substantially 4–5 mm and having inner and outer reflective surfaces for reducing the passage of heat through the material;

c) providing a dispensing means, within said insulated enclosure, for dispensing said gas and including vaporizing means for vaporizing the gas during dispensing;

d) providing temperature sensing means within said insulated enclosure and control means operably linked thereto and to said dispensing means; and e) causing said sensing means and control means to dispense the gas in a vaporized form from the dispensing means whenever the temperature in said insulated enclosure exceeds said pre-determined temperature thereby chilling any atmosphere within the enclosure.

2. A method in accordance with claim 1, wherein the gas, when fully vaporized, has an oxygen concentration of between about 18% and 23% by volume.

3. A method in accordance with claim 2, wherein the remaining portion of the gas is nitrogen.

4. A method in accordance with claim 1, wherein said dispensing means comprises a plurality of spray bars extending within the enclosure for receiving said liquefied gas and said vaporizing means comprises a plurality of spray nozzles positioned along the spray bars for causing gas to be vaporized and dispensed from the bars.

5. In a method of operating a refrigeration system for an enclosure suitable for the storage of items to be refrigerated comprising providing a mechanical refrigeration apparatus for refrigerating the atmosphere within the enclosure causing said apparatus to refrigerate the atmosphere therein and maintaining it within a predetermined temperature range, the improvement comprising dispensing a quantity of breathable, life-supporting cryogenic gas from a plurality of spray nozzles within the enclosure, to chill or further chill the atmosphere therein, said cryogenic gas being dispensed continually during operation of the mechanical refrigeration.

* * * * *